(12) United States Patent
Halstead

(10) Patent No.: US 7,821,168 B2
(45) Date of Patent: Oct. 26, 2010

(54) AXIAL GAP DYNAMO ELECTRIC MACHINE WITH MAGNETIC BEARING

(75) Inventor: Richard Halstead, Rohnert Park, CA (US)

(73) Assignee: Empire Magnetics Inc., Rohnert Park, CA (US)

( * ) Notice: Subject to any disclaimer, the term of this patent is extended or adjusted under 35 U.S.C. 154(b) by 0 days.

(21) Appl. No.: 12/368,188

(22) Filed: Feb. 9, 2009

(65) Prior Publication Data

US 2009/0200883 A1 Aug. 13, 2009

Related U.S. Application Data

(60) Provisional application No. 61/027,471, filed on Feb. 10, 2008.

(51) Int. Cl.
| H02K 21/12 | (2006.01) |
| H02K 49/00 | (2006.01) |
| H02K 7/20  | (2006.01) |
| H02K 16/00 | (2006.01) |
| H02K 31/00 | (2006.01) |
| H02K 1/22  | (2006.01) |

(52) U.S. Cl. .................. 310/156.32; 310/103; 310/105; 310/112; 310/114; 310/156.35; 310/156.36; 310/178; 310/268

(58) Field of Classification Search ............... 310/90.5, 310/267, 268, 178, 180, 103–105, 112, 114, 310/156.32, 156.35–156.36
See application file for complete search history.

(56) References Cited

U.S. PATENT DOCUMENTS

| 3,480,815 A | 11/1969 | Knapp |
| 4,509,564 A | 4/1985 | Sedgewick |
| 4,567,391 A | 1/1986 | Tucker et al. |
| 5,177,387 A * | 1/1993 | McMichael et al. ........ 310/90.5 |
| 5,744,896 A | 4/1998 | Kessinger et al. |
| 6,046,518 A | 4/2000 | Williams |
| 6,185,811 B1 | 2/2001 | Perry |
| 6,348,751 B1 | 2/2002 | Jermakian et al. |
| 6,664,689 B2 | 12/2003 | Rose |
| 7,268,456 B2 | 9/2007 | Harada et al. |
| 2003/0015931 A1 | 1/2003 | Nishimura |
| 2003/0189475 A1* | 10/2003 | Blume ........................ 335/302 |
| 2004/0080869 A1 | 4/2004 | Thompson et al. |
| 2005/0236918 A1* | 10/2005 | van den Bergh et al. .. 310/68 R |
| 2006/0022552 A1 | 2/2006 | Zhu et al. |
| 2006/0152104 A1* | 7/2006 | Hino et al. ................... 310/268 |
| 2006/0273676 A1* | 12/2006 | Naruse et al. .......... 310/156.32 |
| 2007/0152535 A1* | 7/2007 | Shibukawa .................. 310/268 |

FOREIGN PATENT DOCUMENTS

| JP | 55083449 A | 6/1980 |
| JP | 2002247822 A * | 8/2002 |

OTHER PUBLICATIONS

Machine Translation JP2002247822 (2002).*

* cited by examiner

Primary Examiner—Quyen Leung
Assistant Examiner—Jose A Gonzalez Quinones
(74) Attorney, Agent, or Firm—Edward S. Sherman

(57) ABSTRACT

An axial gap electric dynamo machine has a horizontally disposed rotor disk that is stabilized at its periphery by a plurality of permanent magnets connected to a ferromagnetic bearing plate that provides an opposing or repulsive force against the rotor magnets. In some preferred embodiments, the bearing plate magnets are configured in a dual band to further enhance the magnetic field that supports the periphery of the spinning rotor.

21 Claims, 7 Drawing Sheets

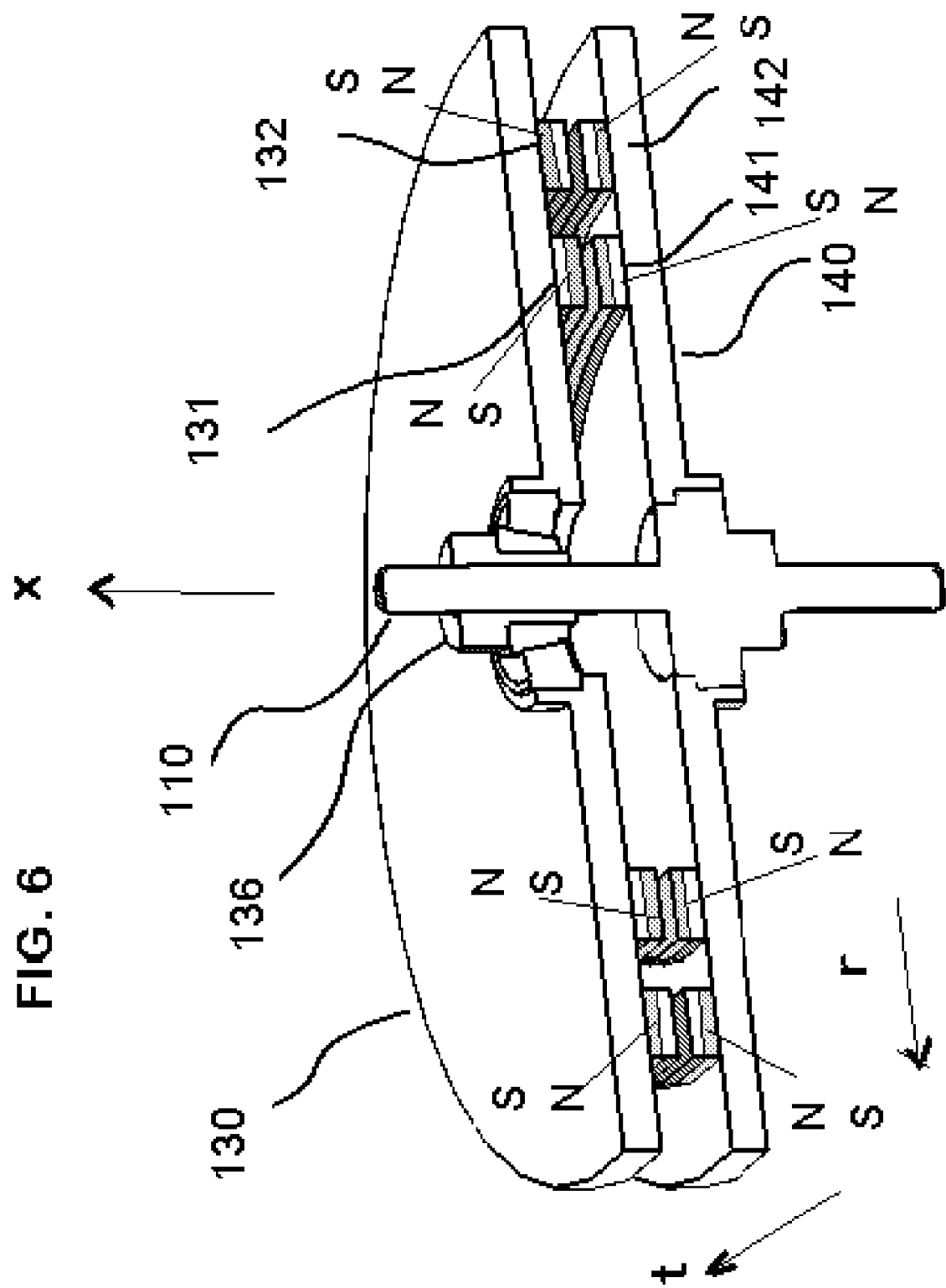

AXIAL GAP DYNAMO ELECTRIC MACHINE WITH MAGNETIC BEARING

CROSS REFERENCE TO RELATED APPLICATIONS

The present application claims priority to the U.S. Provisional patent application of filed on Feb. 10, 2008, having application Ser. No. 61/027,465, which is incorporated herein by reference.

BACKGROUND OF INVENTION

The present invention relates to axial gap dynamo electric machines and more particularly, in improvements of the bearings thereof.

Axial gap dynamo electric machines deploy stators and rotators that are generally in the shape of parallel and adjacent planar discs, with one of more rotators attached to an axle that passes though the center of each disk.

The stators comprises multiple windings that generally wrap across the radial direction of the disc. A Lorenz force is generated by the interaction with magnets arranged along the periphery of the rotor disc. A more detailed description of this technology can be found in the U.S. Pat. Nos. 4,567,391; 4,578, 610; 5,982,069; and 5,744,896, all of which are incorporated herein by reference.

Axial gap EDM's are ideally suitable for Vertical Axis Wind Turbine (VAWT) designs. VAWT offers a number of advantages over conventional Horizontal Axis Wind Turbine (HAWT), such as lower maintenance costs and increased durability and reliability. VAWT installations are believed to present a significantly lower hazard to migrating birds as HAWT systems, as well as require a lower cost and less obtrusive support tower due the axial symmetry of the generator and turbine blades. One such VWAT is disclosed in U.S. Pat. No. 5,531,567, which is incorporated herein by reference. A magnetically levitated VWAT is disclosed in U.S. Pat. No. 7,303,369, which is also incorporated herein by reference.

While VAWT systems are also more economically viable in remote locations than 100+ kW HAWT systems, there is an ongoing need to improve the efficiency of such machines as well as lower their capital cost so reduce the cost of electrical power derived from this renewable energy resource, and make small to medium size facilities more economically viable for say small communities or even the individual homeowner.

Accordingly, it is a general object of the invention to improve the quality and economic viability of large scale axial gap electro-dynamo machines (EDM) for use as generators and motors.

It is a more specific object of the invention to provide an axial gap EDM with efficient magnetic bearings to minimize the need for bearing replacement.

It is a further objective of the invention to provide the above benefits in a cost effective manner and not unduly complicate or compromise the overall design and function of the EDM.

SUMMARY OF INVENTION

In the present invention, the first object is achieved by providing an axial gap dynamo electric machine, the machine comprising: an axle, a stator disk having at least one electrically energizable planar coil array for generating a Lorenz force disposed co-axially about said axle, a rotor disk in rotary co-axle connection to said axle and having at the periphery thereof an array of permanent magnets with each magnetic having an alternating orientation of the poles with respect to the adjacent magnets in the array, a bearing plate disposed immediately below and coplanar with said rotor disk, the bearing plate having two or more circular array of permanent magnets wherein the circular array of the bearing plate coincides with the circular array of permanent magnets about the periphery of said rotor disk to levitate said rotor disk on said axle.

A second aspect of the invention is characterized by an axial gap dynamo electric machine, the machine comprising: an axle, a stator disk having at least one electrically energizable planar coil array for generating a Lorenz force disposed co-axially about said axle, a rotor disk in rotary co-axle connection to said axle and having at the periphery thereof an array of permanent magnets with each magnetic having an alternating orientation of the poles with respect to the adjacent magnets in the array, a bearing plate disposed immediately below and coplanar with said rotor disk, the bearing plate having two or more circular array of permanent magnets wherein the circular array of the bearing plate coincides with the circular array of permanent magnets about the periphery of said rotor disk wherein the magnets of the circular arrays of the bearing disk are oriented with the opposite polarity.

The above and other objects, effects, features, and advantages of the present invention will become more apparent from the following description of the embodiments thereof taken in conjunction with the accompanying drawings.

BRIEF DESCRIPTION OF THE DRAWINGS

FIG. 5A is a plan view showing an alternative embodiment of the rotor structure of FIG. 1 or FIG. 4, whereas FIG. 5B is a enlarged view of a portion thereof.

FIG. 6 is a cut away perspective view of another alternative embodiment of the invention.

DETAILED DESCRIPTION

Figure 1:
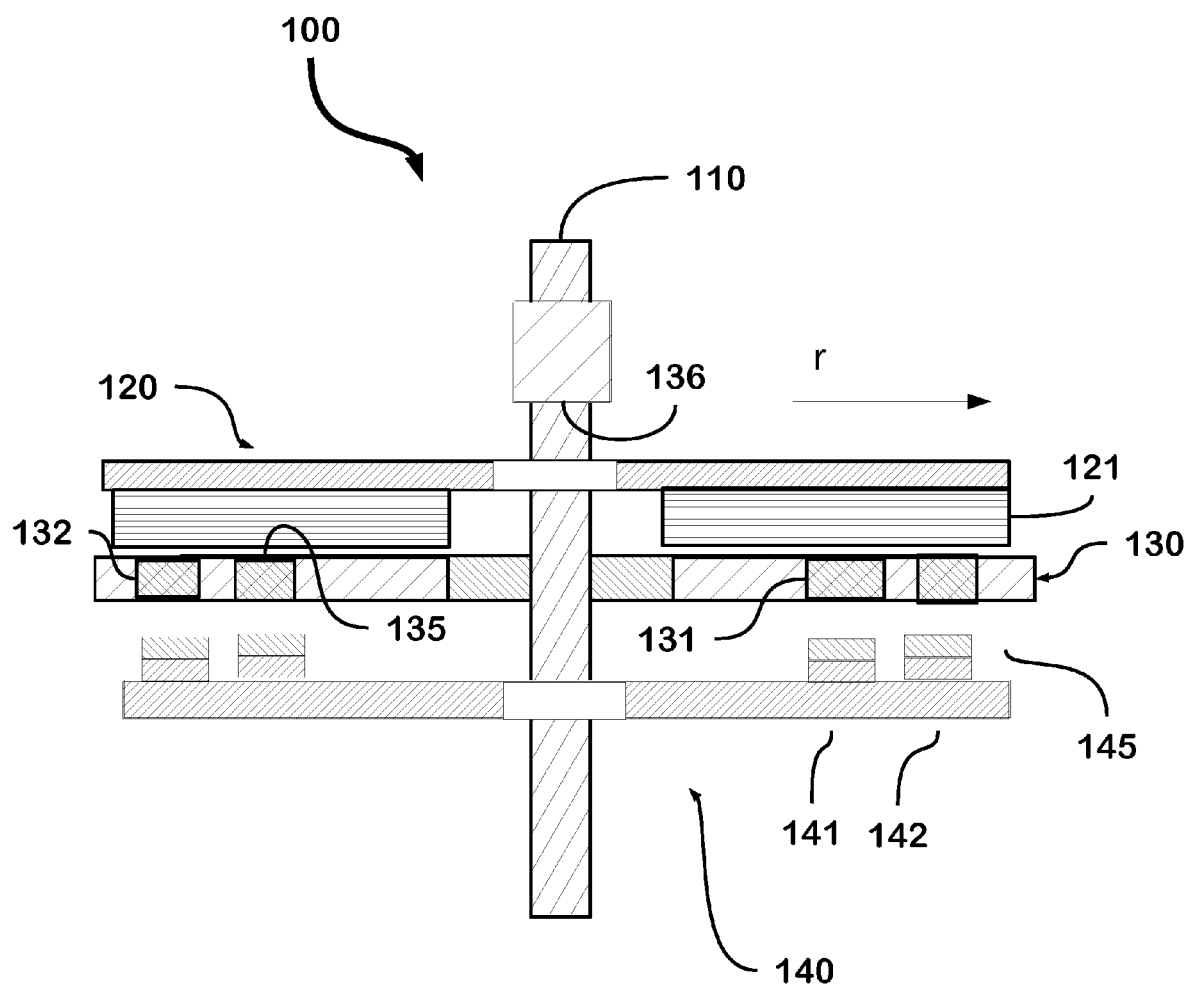
FIG. 1 is a cross-sectional view of a first embodiment of the invention.

Referring to FIGS. 1 through 8, wherein like reference numerals refer to like components in the various views, there is illustrated therein a new and improved Axial gap dynamo electric machine with magnetic bearing, generally denominated 100 herein.

The coordinate system for FIG. 1 through 8 is non-orthogonal and circular, with the x-direction being the long axis of rotor axle 110, r-direction being the radial direction of the stator disk 120 and rotor disk 130, and the t-direction being tangential to the stator disk 120 and rotor disk 130.

FIG. 1 illustrates that primary components of the axial gap EDM 100, which has an axle 110 coupled to at least one rotor disk 130. The rotor disk 130 has at least one, but preferably two rows 131 and 132 of permanent magnets 135 disposed at the periphery. The rotor disk 130 is connected in rotary engagement to axle 110. Each of the permanent magnets 131 is disposed with an alternating orientation of its poles with respect to the adjacent magnets in the row it will be appreciated by one familiar with the construction of motors that the stator disk 120 is generated supported or attached to the motor housing and the axle 110 is confined for free rotation of the axle by rotary type bearings that are also attached or coupled to the motor housing. As the motor housing is generally conventional in the art, it is omitted from the Figures for simplicity of illustration. Preferably, at least one central bearing member 136 supports at least one of the axle 110 or the rotator 130 to maintain the planar orientation of the stator disk 120 and the rotor disk 130.

The size, location and configuration of the bearing supports for the axial and attached rotor will depend on the number or rotors and stators, as well as the diameter of the axle 110. However, to the extent that the rotor disk 130 has a large diameter and is heavy it is advantageous to provide a bearing support distal from axle 110, and thus minimize the requirements for central bearings like 136, and the load thereon. Thus, below rotor disk 130 is a bearing plate 140 having at least one, but preferably two circular rows of magnets 145. As the speed and centrifugal forces are greatest at the outer extent of the rotor 130, proximal to the circular rows of magnets 145, the levitation of the rotor plate 140 is frictionless, other than air resistance, and minimizes the load on the axle and central bearings member(s) 136.

Preferably, the bearing plate 140 is disk shaped and is disposed below rotor plate 130. It should further be appreciated that the disk shaped bearing plate 140 is preferably a ferromagnetic material, such as iron or steel. The magnets 145 of the bearing plate are preferably arranged in a dual circular track near the periphery of the bearing plate 140, having an outer row 141 and an inner row 142 of magnets 145. The individual magnets that comprise each ring or row 141 and 145 are oriented such that the poles are opposed to that of the magnet in the adjacent ring.

The magnets 141 and 142 of the bearing plate 140 can be tangential arc segments attached to the surface of the bearing plate 140, as shown in FIG. 3A.

Figure 2:
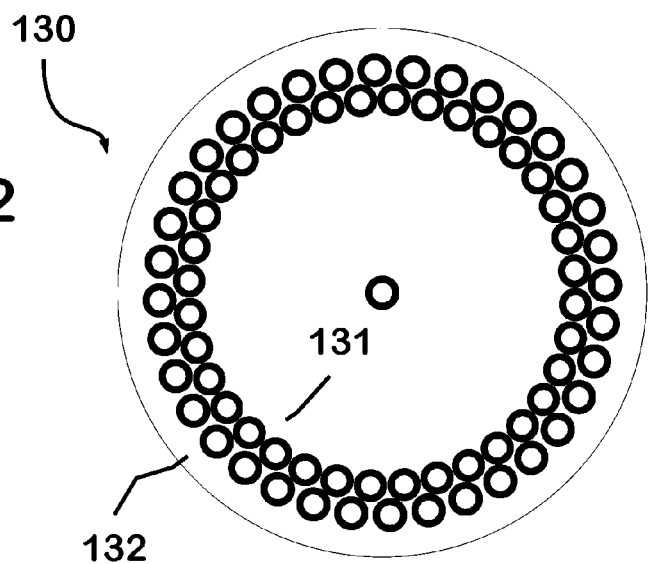
FIG. 2 is a plan view showing an embodiment of a rotor structure of FIG. 1.
Figure 3:
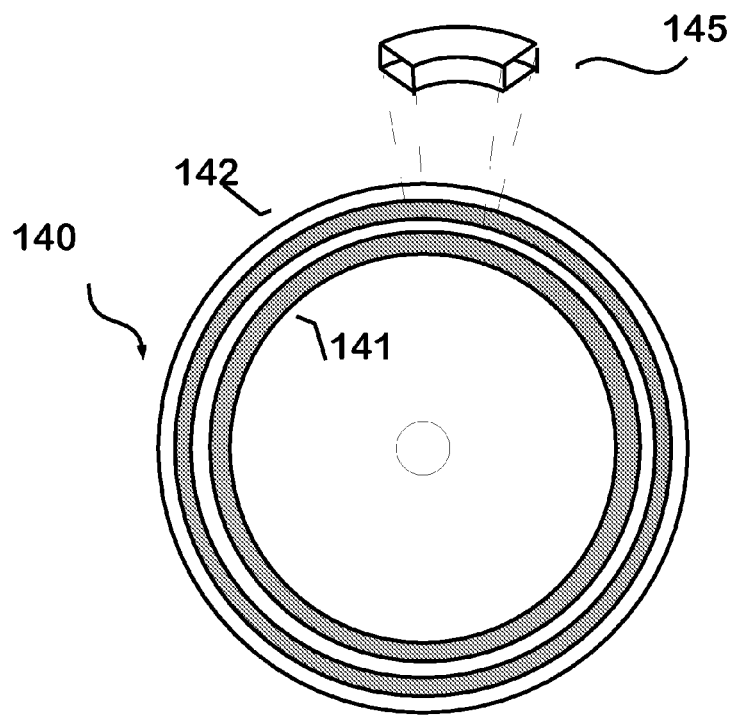
FIG. 3 is a plan view showing an embodiment of the magnetic bearing plate of FIG. 1.
Figure 4:
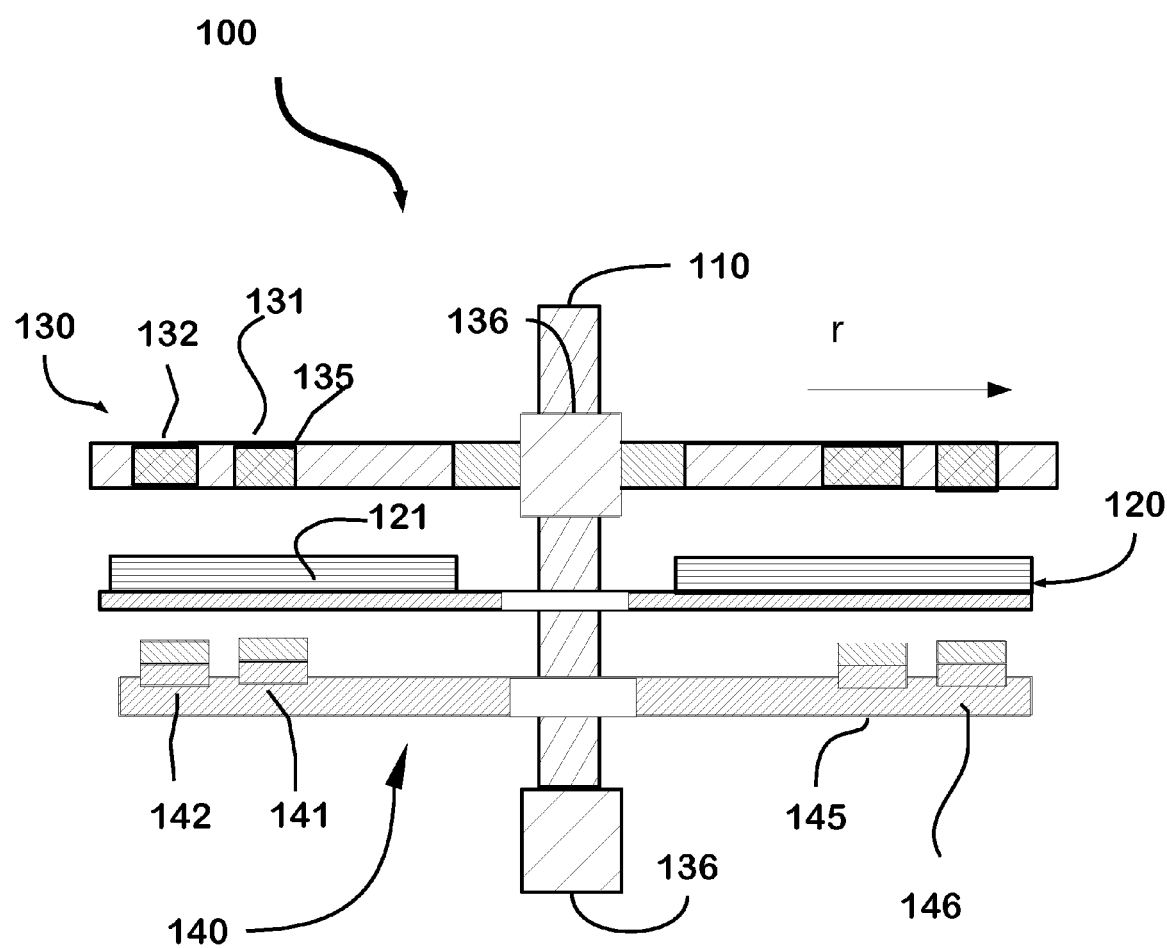
FIG. 4 is a cross-sectional view of another embodiment of the invention.
Figures 5A, 5B:
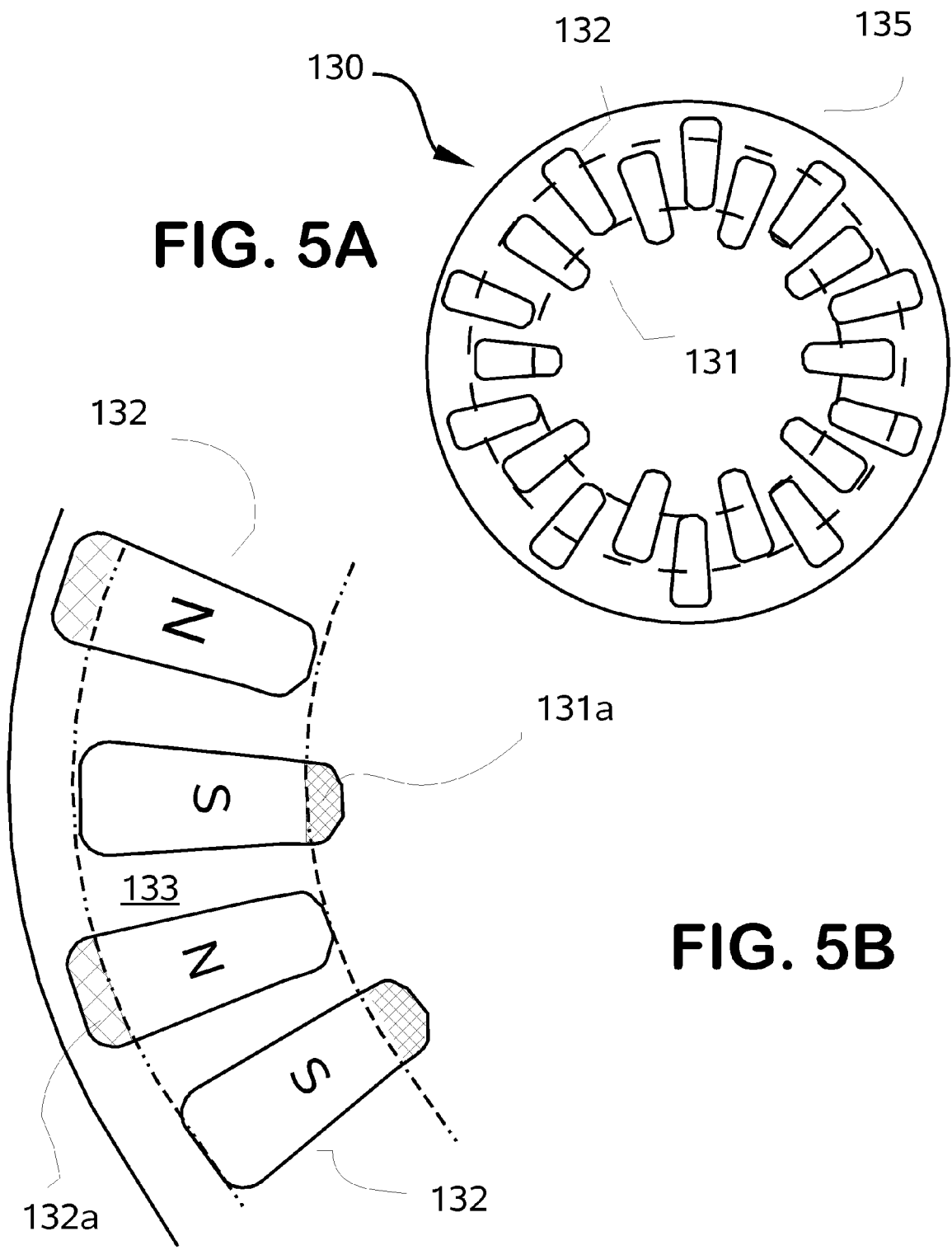

The magnets 135 of rotor 130 can also be tangential arc segments attached to the surface of the rotor, as shown in FIG. 6, but are more preferably at least partially embedded in the rotor plate 140 (as shown in FIGS. 1 and 4) for improved mechanical stability and to reduce the gap between the magnets of the rotor tracks or rings 131 and 132 and the magnetic bearing tracks or rings 141 and 142. Ideally, when the bearing plate 140 and at least one rotor plate 130 are adjacent the gap between there associated magnets is less than the gap between the other portions of the bearing plate 140 and rotor disk 130 that support these magnets. When embedded in the rotor 130, magnets 135 can be round as shown in FIG. 2, but more preferably are trapezoidal shaped with round edges as shown in FIG. 5

Figure 7A:
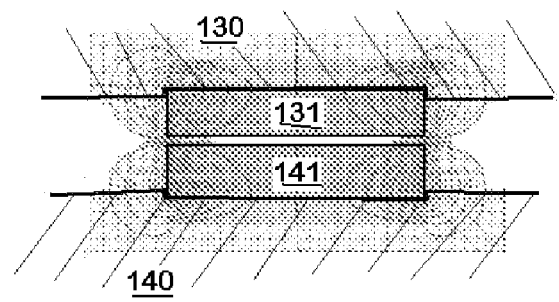
FIG. 7A-D illustrate in cross-sectional elevation another alternative embodiment for the placements of the magnetic with respect to the bearing plates as well as the result of FEM calculation of magnetic field lines.
Figure 7B:
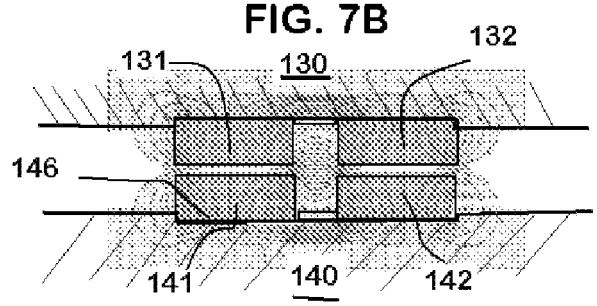
Figure 7D:
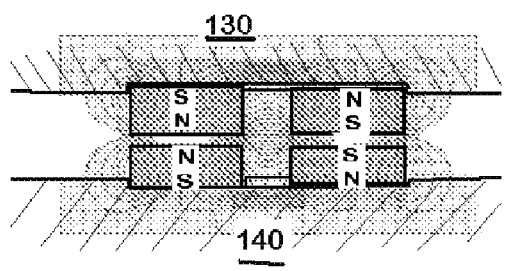

Accordingly, as shown in FIG. 7D, it is also preferred that polarity of the pairs of magnets arranged about the periphery of the stationery bearing plate 140 alternate. That is, in outer rings 132 (on the rotor 130) and 142 (on the bearing plate 140) the magnets 135 and 145 respectively are arranged to have their N poles face each other across the gap between the inner rings 131 and 142, while the S poles should face each other across the gap between the rotor plates 130 and the bearing plate 140. It has been discovered that this arrangement results in an increased levitation force compared to arranging the magnetic in each track with the same polarity.

The resulting magnetic levitation of the rotor 130, using passive magnets 145 has several advantages. The system is generally mechanically stabilized with a bushing type bearing 136 on axle 1 10. This stabilization can be accomplished in a number of ways including ball and roller bearings. This general concept can be applied to large diameter motors and alternators where the magnetic bearing system disclosed herein can be substituted for expensive and speed limiting mechanical bearing systems. Ball bearings have upper speed limits that go down as the diameter of the bearings increase, with the expense of the bearings increases roughly as the square of the radius. In addition to cost advantages, the magnetic bearing system disclosed herein has very low friction. It is expected that the disclosed magnetic bearing system will have a practically infinite life due to no direct contact and mechanic wear.

Further, although a single bearing 136 may still be required, it will be easier to replace during maintenance.

The magnets 145 that are supporting the rotor 130 are also the motor magnets, as shown in the configuration of FIG. 4, wherein the stator 120 is now disposed between the rotor and the bearing plate 140. Thus in a sense, magnets 145 are doing double duty, and hence reducing the cost and weight of the device 100. It should be appreciated that various other patterns of magnets can be used.

Another preferred approach is to have the ends of rectangular, trapezoidal or arc segment magnets 135 be extended inward or outward depending on the polarity, so the ends of the magnets are the supporting element, while the middle or main body of the magnet is active as the motor or alternator. As shown in the rotor 130 in FIG. 5, narrower edge of the trapezoidal magnet is oriented toward the center of the disk or axle, increasing the packing density. These magnets 135 are longer in the radial direction so that they can be arranged in partially overlapping rows 131 and 132. The polarity is the same in each row, that is the outer row 132 has the N pole up, while the inner row 131 has the S pole up. This results in the overlapping portions of the rows (region 133) providing adjacent magnets of opposite polarity (i.e. N-S-N-S if straddling the middle point of the rows) for interaction with the stator coils. Portions of each magnet also extend beyond the magnet of opposite polarity in the adjacent row, that is the magnets in row 132 have a portion 132a extending in the outward radial direction beyond row 131, while the magnets in row 131 have a portion 131b extending in the inward radial direction, beyond the magnet of row 132. The outward extending portions 132a and inward extending portions 131b are repelled by the magnets of row 142 and 141 respectively of magnetic bearing 140 to provide the magnetic bearing function. Thus the motor stator windings 120 will react with the magnets in portion 133 where they overlap, while the bearing magnets 141/142 interact with the ends 131b/132a of the rotor 130 magnets where they do not overlap.

As shown in FIG. 4, the permanent magnets 135 are also preferably at least partially embedded in the rotor disk 130. Further, it is also preferable that the magnets 145 of the bearing disk 140 are slightly embedded therein. Accordingly, annular grooves 146 are provided in bearing plate 140 to at least partially embed the magnets 145.

Figure 7C:
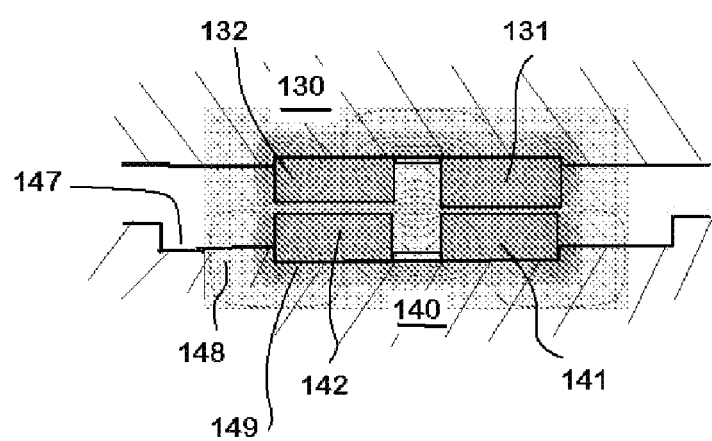

It has been discovered and established by the Finite Element Modeling (FEM) that the groove design and placement of the magnets 145 can greatly increase the net repulsive force that levitates the rotor disk 130 and any other structure attached to the axle 110, such as turbine blades of a generator or a windmill. The results of deploying single and double track of magnets 145 on the bearing plate 140 using various groove configuration is shown in FIG. 7A-C in which the geometric design of the magnets and groove is shown in heavy black lines superimposed over the calculated magnetic field lines. The resultant net repulsive force in N/m for these configurations are plotted in FIG. 8 as a function of magnet field strength in Tesla. The magnets 135 and 145 are preferably of a Nb—Fe—B alloy to provide high field strength. The most efficient design is shown in FIG. 7C in which the bearing plate 140 has a stepped groove pattern 147 with a bottom groove 149 that fits the outer dimension of the magnetic and a upper surrounding groove 148 that is wider than bottom groove in which the bottom groove is disposed within the upper surrounding groove.

The FEM calculations where performed on a rotor plate 140 wherein the groove 146 for holding the outer rows 142 of bearing magnets had an outer diameter of about 0.82 m and the groove for inner row 141 had an inner diameter of about 0.70 m, for a total track length of 4.8 m. FIG. 7A shows the geometry and resulting magnetic field lines when a single magnet track 141 and 131 is used in the bearing plate 140 and rotor 130. Hence these magnets fit in the groove with a width of 120 mm, wherein each magnet has a height 30 mm and for a total mid-point circumference of 4.8 m. The depth of the groove for holding the magnets in FIGS. 7A and 7B is only several mm. In all cases (FIG. 7A-C) the air gap between the face of the magnets 135 and 145 is 3 mm.

In FIG. 7B the same calculations are performed but the single magnets of the same total volume is split into two dual rails or tracks in which the magnets in each of the dual tracks or rings have a height 30 mm and a width 60 mm.

In FIG. 7C, the magnets 145 on the rotor disk 140 are now disposed in a stepped groove 147 with the bottom step 149 that secure the magnets have a depth of about several mm, but potentially up to about a third of the magnet height. The second step 148, on both side of the lower bottom step 149 has a height that extends from just below the top of the magnet to the edge of the bottom step 149. It is desirable that the width of the bottom step is at least greater than the gap between the rotor 130 and the bearing plate 140, with the top of the bearing plate magnets 145 being at or slighting above the top of the bearing plate 140.

Figure 8:
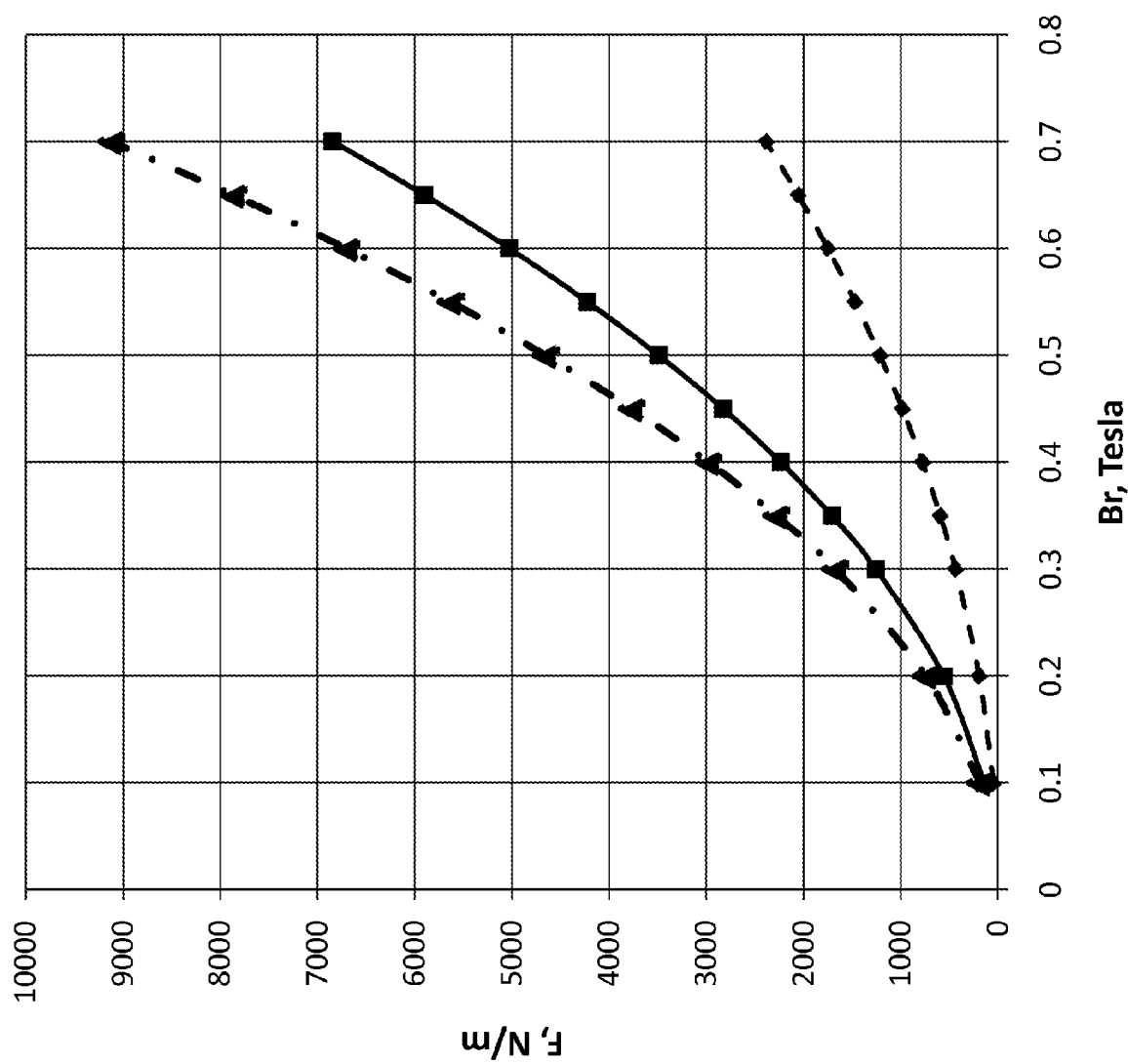
FIG. 8 is a graph showing the repulsive force generated by the alternative placements of the magnets with respect to the bearing plates for FIG. 7A-C as a function of the magnet strength.

As shown in FIG. 8, the force (in N/m), normalized to a 1 m length of track, is plotted as a function of the magnet strength, Br, in Tesla. Thus, for the same mass of magnetic material, that is splitting the wider magnet of FIG. 7A into the dual track configuration of FIG. 7B, produces a surprising large increase of repulsive force of 187%. The placement of these magnets into the steps as shown in FIG. 7C results in an every greater increase of 283% with respect to the configuration of the single track of FIG. 7A, as well as impressive increase of 33% over the double track arrangement in FIG. 7B. It should be appreciated that the placement of magnet 145 is a single stepped groove 147 is also expected to improve the performance of a single track bearing magnet of FIG. 7A.

Given the relatively high cost of magnets, which is largely proportional to weight, the added machining and assembly costs to create the groove or steeped groove is insignificant, as the % increase in force translated almost directly to a cost savings. Further improvements in efficiency can also be expected with 3 or more row or tracks of bearing magnets 145. However, absent the discovery herein of the much higher efficiency gained by splitting the magnets into dual tracks, one of ordinary skill in the art would not be motivated to do so, as creating two tracks versus one wider track requires more manufacturing and assembly steps which would increase the manufacturing cost.

In should now be appreciated that the embodiments of the invention disclosed herein permits the construction of large scale axial gap electric dynamo machines for use as generators and motors, in particular for wind power generation of electricity. Such magnetic bearings permit all types of axial gap dynamoelectric machine to operate at higher speeds with improved reliability and lifetime, while minimizing equipment maintenance. However, the higher efficiently of the magnetic bearing system described herein it is anticipated that the various embodiment need not be limited to EDM's, but may be used in other rotary devices that operate at low or high speed and require ultra low friction for reliability or the mechanical stability of the bearing system described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

The invention claimed is:

1. An axial gap dynamo electric machine, the machine comprising:
    a) an axle,
    b) a stator disk having at least one electrically energizable planar coil array for generating a Lorenz force disposed co-axially about said axle,
    c) a rotor disk in rotary co-axle connection to said axle and vertically adjacent said stator disk for being responsive to the energization thereof and having disposed between the outer periphery thereof and the outer half of each radial section of the rotor disk at least two concentric arrays of permanent magnets with each magnet having an alternating orientation of the poles with respect to the adjacent magnets in the same concentric array, and the opposite orientation of the nearest magnetic in the adjacent concentric array,
    d) a bearing plate having at least two circular arrays of permanent magnets, wherein the circular array of the bearing plate laterally coincide with the circular array of permanent magnets about the outer periphery of said rotor disk to levitate said rotor disk and said axle.

2. An axial gap dynamo electric machine according to claim 1 wherein the bearing plate is disposed immediately below and coplanar with said rotor disk.

3. An axial gap dynamo electric machine according to claim 1 wherein the permanent magnets of said bearing plate are arrayed in at least two substantially co-planar circular concentric rings, each ring having all of the magnets therein arranged with the opposing polarity from all of the magnets in the other ring.

4. An axial gap dynamo electric machine according to claim 1 wherein said bearing plate is ferromagnetic.

5. An axial gap dynamo electric machine according to claim 1 wherein the permanent magnets of said rotor plate are trapezoid shaped with the longer axis of the trapezoid oriented in the radial direction and arranged in a dual outer track, wherein tangentially adjacent magnets are staggered in radial placement with respect to said axle to provide partial overlapping region there between, with the magnets of each track being oriented with the opposite polarity, so that the portion of the magnets adjacent in the overlapping region alternate in polarity in the tangential direction.

6. An axial gap dynamo electric machine according to claim 5 wherein the individual magnets that comprise each circular ring of the bearing plate are oriented such that their poles are opposed to that of the magnets of the dual outer track of said rotor that extend beyond the overlapping region thereof.

7. An axial gap dynamo electric machine according to claim 1 wherein the permanent magnets of said bearing plate are at least partially embedded therein.

8. An axial gap dynamo electric machine according to claim 3 wherein the permanent magnets of said bearing plate are at least partially embedded in a upper surrounding groove that is at least the combined width of the permanent magnets of the circular rings.

9. An axial gap dynamo electric machine according to claim 8 wherein the permanent magnets of said rotor disk are at least partially embedded in a bottom groove disposed within the upper surrounding groove wherein the magnets that form the first and second circular rings are closer together than they are distal from the boundary of the upper surrounding groove.

10. An axial gap dynamo electric machine according to claim 3 wherein the permanent magnets of said rotor disk are disposed in a first annular grove on said rotor disk.

11. An axial gap dynamo electric machine according to claim 10 wherein the permanent magnets of said bearing plate are at least partially embedded in an upper surrounding annular grove on said bearing plate, wherein both circular rings of permanent magnets on said bearing plate have a lower portion embedded in a bottom annular groove formed in said first annular groove.

12. An axial gap dynamo electric machine according to claim 5 wherein permanent magnets of said rotor disk are at least partially embedded therein.

13. An axial gap dynamo electric machine according to claim 12 wherein at least some of the permanent magnets are a Nb—Fe—B alloy.

14. An axial gap dynamo electric machine according to claim 1 wherein the gap between the permanent magnets in said rotor and said bearing plate are separated by a distance that is less than the gap between the other portions of said rotor and said bearing plate.

15. A machine comprising:
    a) an axle,
    b) a disk disposed orthogonal to and on rotary co-axle connection to said axle and having at substantially at the outer periphery thereof an array of permanent magnets,
    c) a fixed bearing plate having at least two circular array of permanent magnets, wherein the circular array of the bearing plate coincides with the array of permanent magnets on the outer periphery of said disk wherein the magnets of the disk are oriented to face at least some of the adjacent magnets on the bearing plate with the same polarity thereby urging said disk and said axle upward,
    d) wherein the permanent magnets of said disk are trapezoid shaped with the longer axis of the trapezoid oriented in the radial direction and arranged in a dual outer track wherein tangentially adjacent magnets are staggered in radial placement with respect to said axle to provide partial overlapping region there between, with the magnets of each track being oriented with the opposite polarity, so that the portion of the magnets adjacent in the overlapping region alternate in polarity in the tangential direction.

16. A machine according to claim 15 wherein the bearing plate is disposed immediately below and coplanar with said disk.

17. A machine according to claim 15 wherein each rings of magnets on said bearing plate has all of the magnets therein arranged with the opposing polarity from all of the magnets in the other rings.

18. A machine according to claim 15 wherein said bearing plate is ferromagnetic.

19. A machine according to claim 15 wherein the individual magnets that comprise each circular ring of the bearing plate are oriented such that their poles are opposed to that of the magnets of the dual outer track of said disk that extend beyond the overlapping region thereof.

20. An axial gap dynamo electric machine, the machine comprising:
    a) an axle,
    b) a stator disk having at least one electrically energizable planar coil array for generating a Lorenz force disposed co-axially about said axle,
    c) a rotor disk in rotary co-axle connection to said axle and vertically adjacent said stator disk for being responsive to the energization thereof and having at the outer periphery thereof an array of permanent magnets with each magnetic having an alternating orientation of the poles with respect to the adjacent magnets in the array,
    d) a bearing plate having at least two circular array of permanent magnets, wherein the circular array of the bearing plate laterally coincide with the circular array of permanent magnets about the outer periphery of said rotor disk to levitate said rotor disk and said axle,
    e) wherein the circular arrays of permanent magnets of said rotor disk are disposed in an upper surrounding grove on said rotor disk and at least partially embedded in a bottom groove disposed within the upper surrounding groove wherein the magnets that form the first and second circular rings are closer together than they are distal from the boundary of the upper surrounding groove.

21. An axial gap dynamo electric machine according to claim 20 wherein the permanent magnets of said rotor plate are trapezoid shaped with the longer axis of the trapezoid oriented in the radial direction and arranged in a dual outer track, wherein tangentially adjacent magnets are staggered in radial placement with respect to said axle to provide a partial overlapping region there between, with the magnets of each track being oriented with the opposite polarity, so that the portion of the magnets adjacent in the overlapping region alternate in polarity in the tangential direction.

\* \* \* \* \*